Figure 5:
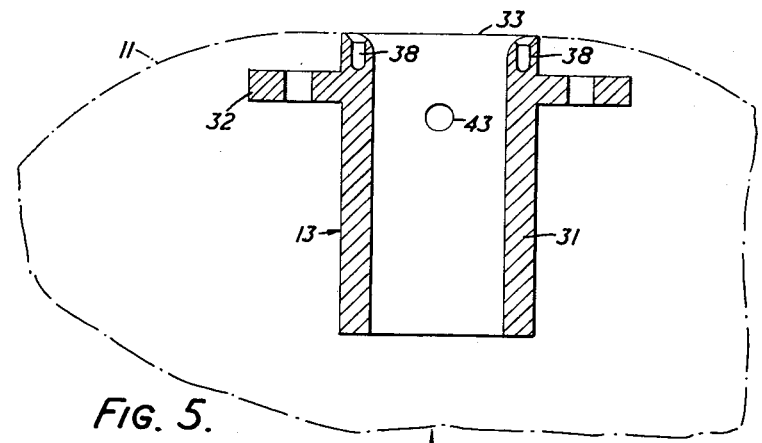

Dec. 5, 1961  B. LITTLEWORTH ET AL  3,011,604
RELEASABLE CONNECTORS
Filed Sept. 22, 1958  3 Sheets-Sheet 1
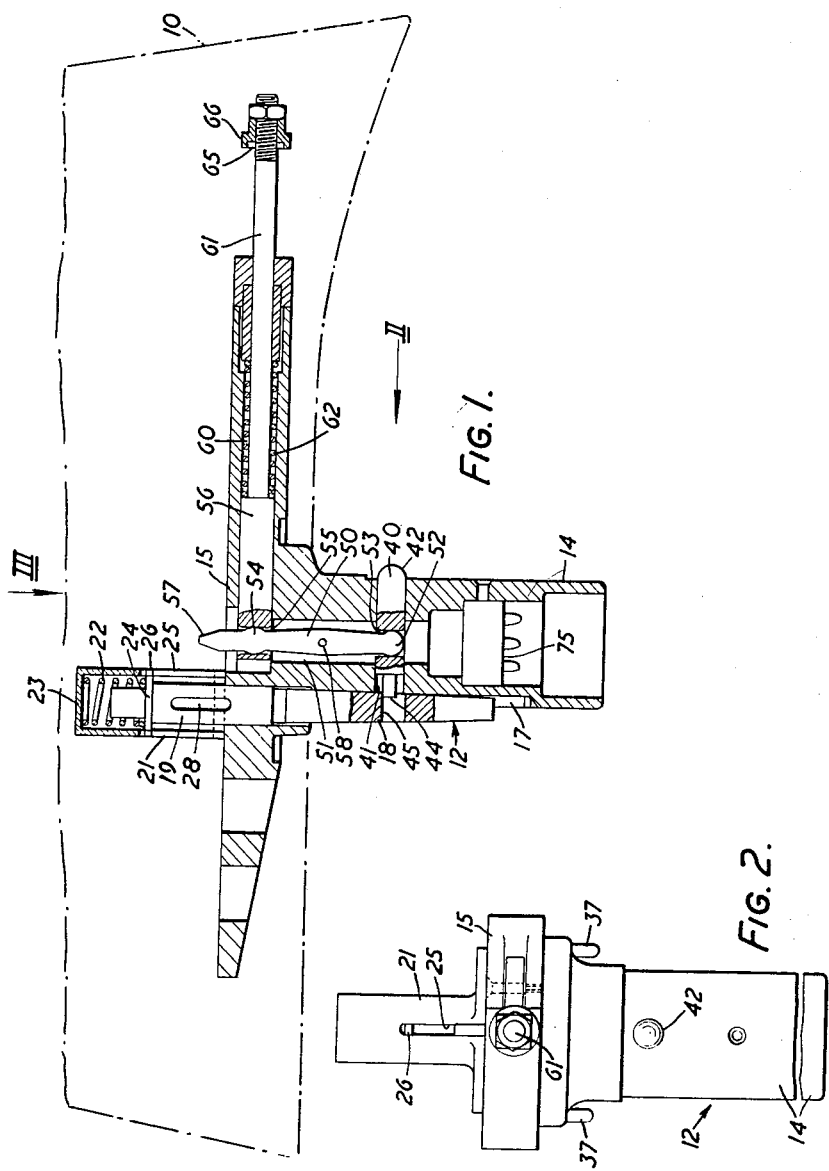
INVENTORS
FRANK MARTIN
BERTRAM LITTLEWORTH
BY
Watson, Cole, Grindle & Watson
ATTORNEY

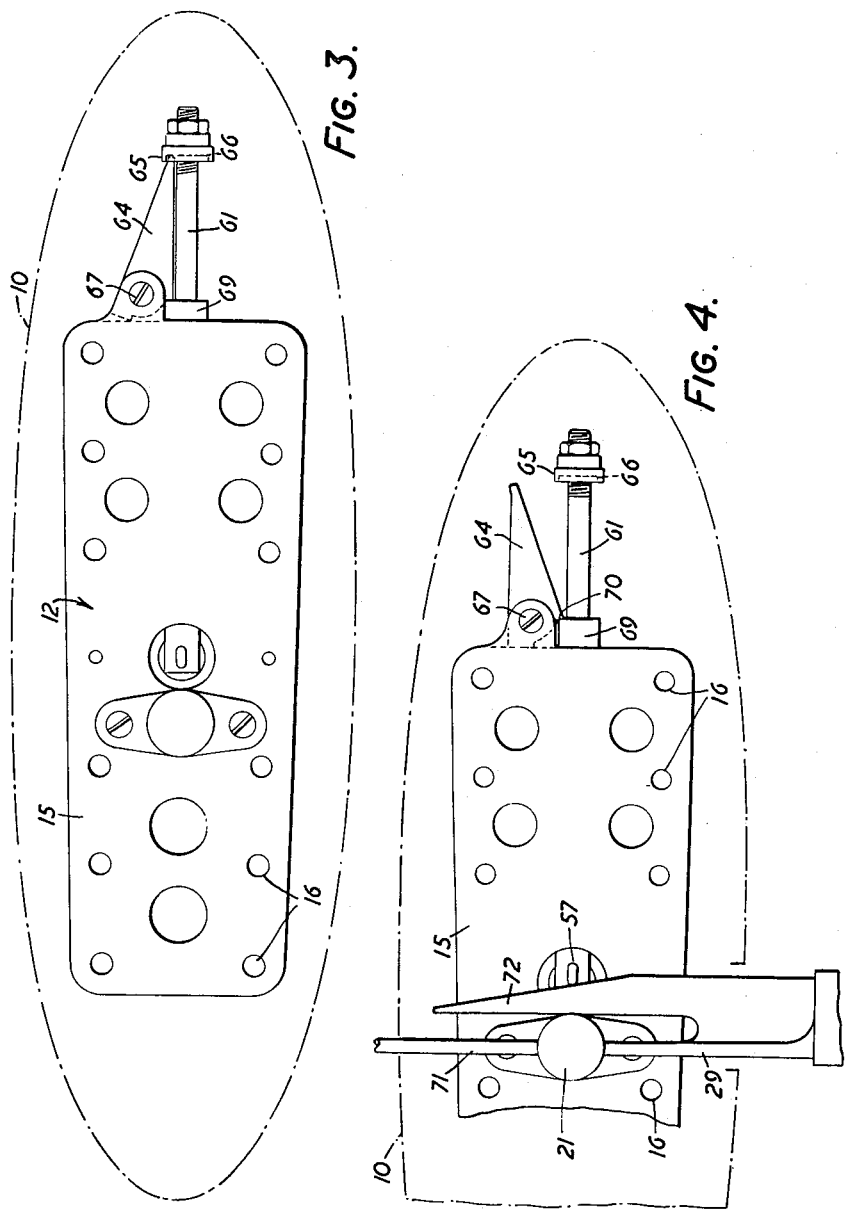

Dec. 5, 1961   B. LITTLEWORTH ET AL   3,011,604
RELEASABLE CONNECTORS
Filed Sept. 22, 1958   3 Sheets-Sheet 3

INVENTORS
FRANK MARTIN
BERTRAM LITTLEWORTH
BY
Watson, Cole, Grindle & Watson
ATTORNEY

United States Patent Office 3,011,604
Patented Dec. 5, 1961

3,011,604
RELEASABLE CONNECTORS
Bertram Littleworth and Frank Martin, Hayes, England, assignors, by mesne assignments, to Fairey Aviation Limited, Hayes, England, a company of Great Britain
Filed Sept. 22, 1958, Ser. No. 762,390
Claims priority, application Great Britain Sept. 23, 1957
12 Claims. (Cl. 189—36)

This invention relates to an improved releasable connector for securing together quickly and firmly two members that may subsequently require to be disconnected. The invention is particularly, although not exclusively, applicable to a connector for releasably attaching a wing to the body of a guided missile.

According to the present invention the connector comprises a spigot member for permanent attachment to one of the two members to be releasably connected together, and a co-operating socket member for permanent attachment to the other member, the spigot of the spigot member being a sliding fit in the socket of the socket member, releasable locking means for interlocking the spigot and socket in their fully connected position to prevent the withdrawal of the spigot from within the socket, and a tapered wedging pin slidably mounted in one or other of the spigot and socket members and movable axially between a withdrawn position and a wedging position between the co-operating surfaces of the spigot and socket, the wedging pin lying in a correspondingly tapered recess defined between the said co-operating surfaces when the spigot and socket members are assembled together in their fully connected positions.

Preferably there is provided spring means for urging the wedging pin towards its wedging position, and latching means for latching the wedging pin in its withdrawn position against the action of the spring means. When the latch is released the spring means drives the wedging pin sharply forwards into the wedging engagement between the spigot and socket.

In one construction the co-operating surfaces of the spigot and socket are both formed with elongated grooves extending parallel to their axes, with the two grooves together defining the tapered recess when the spigot and socket are assembled in their fully connected positions, and the depth of at least one of the grooves increasing progressively and uniformly from one end to the other. The wedging pin may be of tapering circular section and the two co-operating grooves both of equally tapering semi-circular section.

Conveniently the wedging pin is carried by the spigot member and extends in the groove in the latter with its smaller end directed towards the outer end of the spigot.

In one arrangement of the invention there is provided a transverse locking pin slidably mounted in a bore extending through the spigot transversely to its axis, the locking pin being movable between a locking position in which one end projects laterally from the side of the spigot into a co-operating hole formed in the side of the socket to constitute the locking means for interlocking the spigot and socket in their fully connected position, and a depressed position in which that end of the locking pin is flush with the side of the spigot whilst the other end projects transversely from the spigot groove into a recess formed in the wedging pin to constitute the latching means which holds the wedging pin in its withdrawn position.

A pivoted lever mechanism housed in the spigot member may be provided for moving the locking pin between its two extreme positions, the mechanism being preferably spring-biased in the direction corresponding to movement of the locking pin towards its locking position and provided with a latch for retaining it with the locking pin in an intermediate position.

The end of the locking pin which engages the locking hole in the sleeve is preferably rounded so as to act as a ball-catch when the locking pin is in its intermediate position.

A single key may be provided which when inserted in a keyhole formed in the connector both engages the wedging pin to raise it by a camming action to its withdrawn position against the action of its associated spring, and engages the mechanism associated with the locking pin with a camming action to move the locking pin from its locked position into its intermediate position, for the purpose of putting the connector in a condition in which the spigot can be withdrawn from the socket.

Figure 6:
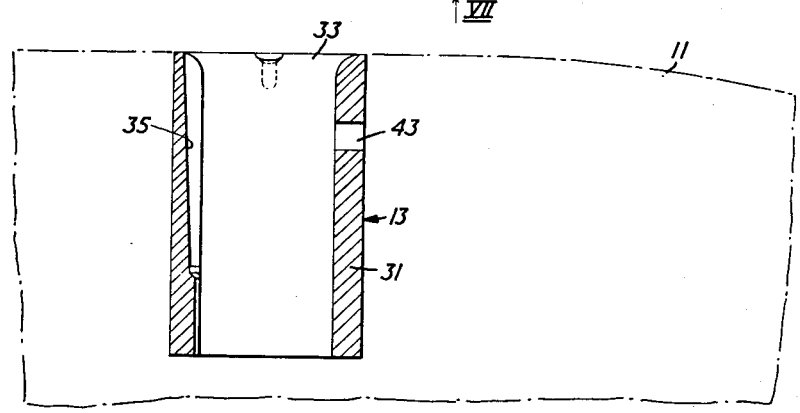
Figure 7:
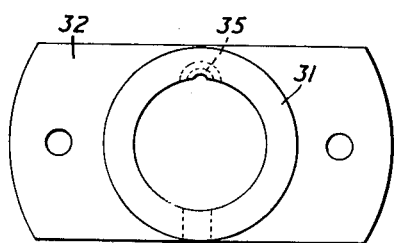

The invention may be carried into practice in various ways but one specific embodiment will now be described by way of example with reference to the accompanying drawings, in which:

FIGURE 1 is a longitudinal sectional view of the spigot member of a connector in position in the inner end of a detachable wing, FIGURE 2 is a side elevation of the spigot member as seen in the direction of the arrow II in FIGURE 1, FIGURE 3 is an end view of the spigot member as seen in the direction of the arrow III in FIGURE 1, FIGURE 4 is a view similar to FIGURE 3 showing the insertion of an extractor key into the spigot member for releasing it from engagement in an associated socket in the side of a missile body, FIGURE 5 is a longitudinal sectional view of the socket member taken in a plane transverse to the axis of the missile body, FIGURE 6 is a longitudinal section of the socket member taken in a plane at right angles to that of FIGURE 5, and FIGURE 7 is an end view of the socket member as seen in the direction of the arrow VII in FIGURE 5.

In the illustrated embodiment a releasable connector assembly for securing a removable wing 10 of a guided missile to the body 11 of the missile is formed in two main parts, namely a spigot member 12 which is attached to the inner end of the wing 10 in a protruding position and a co-operating socket member 13 which is recessed in the missile body 11 and which receives the spigot 14 of the spigot member 12 to locate and secure the wing to the body.

The spigot member 12 comprises a generally flat base plate 15 provided with holes 16 for securing it to the inner end of the wing and having an integral spigot 14 of generally cylindrical section protruding outwardly from the centre of its outer face in a direction generally parallel to the length of the wing. The spigot 14 is provided with a tapered groove 17 of semi-circular section formed in its cylindrical surface and extending longitudinally from the root towards the tip of the spigot. In this groove can slide a correspondingly tapered wedging pin 18 of full circular section, whose inner and larger end extends integrally from a coaxial plunger 19 which extends through a bore in the base plate 15 and slides in a cylindrical housing 21 mounted on the rear face of the base plate 15. A compression spring 22 acting between the closed inner end 23 of the housing 21 and a circumferential flange 24 on the plunger head urges the plunger 19 and the tapered pin 18 axially in the outward direction towards the smaller end of the tapered groove 17 in the spigot 14. The cylindrical housing 21 is provided with straight longitudinal slots 25 in its wall in which engage studs 26 projecting transversely from the side of the plunger head so as to hold the plunger 19 against rotation about its axis whilst permitting its axial movement within the limits allowed by the slots 25. The plunger 19 is also formed with an axially elongated slot 28 extending completely through it from side to side, for engagement by a tapered extractor key 29 (FIGURE 4) for the purpose of moving the plunger 19 inwardly by a camming action against the force of the spring 22.

The spigot 14 and its associated tapered pin 18 fit into the co-operating socket member 13, which comprises a cylindrical sleeve 31 provided with an integral transverse flange 32 for fixing it to the body 11, the sleeve 31 being buried in the interior of the body 11 with its open end 33 flush with the surface of the body 11 to provide the necessary socket for engagement by the spigot 14 on the wing 10. To facilitate the entry of the spigot 14 the internal edge of the bore of the sleeve 31 at its open end 33 is smoothly rounded.

The sleeve 31 is also formed in its internal cylindrical surface with a tapered longitudinal groove 35 of semicircular section similar to the groove 17 on the side of the spigot 14, so that when the two grooves 17 and 35 are placed together in register with one another, they form a tapered recess of circular section just large enough to receive the tapered pin 18 of the spigot. Accordingly when the wing 10 is to be attached to the missile body 11, the spigot 14 is inserted into the socket afforded by the bore of the sleeve 31 and is pushed fully home with the two tapered grooves 17 and 35 in alignment with one another so that the grooves come into register, and so that the tapered pin 18 lies in the tapered recess afforded by the two registering grooves 17 and 35 and can be forced axially outwards by its spring 22 towards the smaller end of the recess with a wedging action to wedge the spigot 14 firmly inside the socket afforded by the sleeve 31.

The spigot 14 is provided at its root adjacent to the base plate 15 with a pair of dowel pins 37 protruding in the axial direction one on either side of the spigot, whilst the rim of the sleeve 31 of the socket member at its open end 33 is formed with a pair of holes 38 accurately drilled at diametrically opposite points. The holes 38 receive and mate with the dowel pins 37, to ensure that the tapered recesses 17 and 35 will be accurately in alignment with one another, when the spigot 14 is pushed fully home into the bore of the sleeve 31.

To prevent the accidental withdrawal of the wing 10 from the body 11 of the missile, the spigot 14 is provided with a transverse locking pin 40 which slides in a bore 41 extending completely through the spigot transversely to its axis, the bore 41 terminating at one end in the tapered groove 17 of the spigot. One end of the locking pin 40 is formed with a hemispherical head 42 which can protrude transversely from the side of the spigot 14 to engage in a locking hole 43 formed in the side wall of the sleeve 31 of the socket member. At its other end the locking pin 40 is formed with a detent 44 which enters a recess 45 formed in the side of the tapered pin 18 of the spigot 14, so that when the detent is engaged in the recess in the pin 18 it holds the pin 18 and the plunger 19 inwardly against the action of its associated spring 22, so that the tapered pin 18 is withdrawn from its fully home, wedging position in the tapered recess afforded by the aligned tapered grooves 17 and 35 of the spigot and socket members. The sliding movement of the locking pin 40 in its bore 41 transverse to the spigot axis is controlled by a lever 50 extending within a bore 51 formed in the spigot 14 intersecting the transverse bore 41 which contains the locking pin 40. One end 52 of the lever 50 is rounded and is engaged in a close-fitting hole 53 formed in the body of the locking pin 40, whilst the lever 50 is formed close to its other end with a rounded bearing portion 54 engaged in a recess 55 in an arming plunger 56, through which the lever 50 extends with its end 57 protruding beyond the inner face of the spigot base plate 15 for engagement by the tapered key 29 referred to above. The lever 50 is pivoted about the point intermediate in its length between the two rounded portions 52 and 54 by means of a pivot pin 58 which extends transversely through the lever and is pivoted at its ends in the walls of the axial bore 51 in the spigot 14.

The arming plunger 56 slides in a cylindrical bore 60 formed in the base plate 15 of the spigot member 12, the bore 60 extending transversely to the spigot axis with the end of the arming plunger projecting at 61 from the open end of the bore 60 beyond the end of the base plate 15. A compression spring 62 within the base plate bore 60 acts on the arming plunger 56 and tends to move it in the inward direction, that is to say, towards the tapered pin 18 of the spigot member 12. The arming plunger 56 can however be retained in the outer position illustrated in FIGURE 1 against the action of its associated spring 62 by the engagement of an arming catch 64 behind an abutment 65 afforded by a recessed nut 66 on the protruding end 61 of the arming plunger. The arming catch 64 comprises a small pivoted lever which is pivoted at 67 to the end of the base plate 15 with its axis at right angles to and spaced from that of the arming plunger 56. The lever is rotatable about its pivot into and out of engagement behind the recess of the nut 66, being spring-biased towards its disengaged position by means of the arming spring 62 acting on a sliding collar 69. The lever 64 is restrained in engagement with the recessed nut 66 so long as the ball catch afforded by the rounded end 42 of the locking pin 40 remains protruding from the bore 41. When the ball catch 42 is depressed to move the arming plunger 56 outwardly, the tip of the arming catch 64 is released from the recess in the nut 66 and flies outwardly by rotation about its pivot under the force of the arming spring 62, acting through the collar 69 on an abutment 70 of the arming catch 64. The outward pivotal movement of the arming catch 64 is limited by the engagement of a face of the arming catch with the end of the base plate 15 in the position shown in FIGURE 4, in which the arming catch 64 provides the abutment 70 for the reaction of the arming spring.

The locking pin 40 is thus connected to the arming plunger 56 by the pivoted lever 50 for movement thereby in the direction transverse to the spigot axis between a (1) depressed position in which the detent 44 is fully engaged in the recess 45, in the tapered pin 18 to hold the latter in its withdrawn position, and in which position the hemispherical head of the locking pin constituting the ball catch 42 is depressed flush with the cylindrical surface of the spigot 14, (2) through an intermediate position in which the detent 44 still holds the tapered pin 18 withdrawn but the ball catch 42 protrudes slightly from the side of the spigot 14, (3) to a locking position in which the detent 44 is disengaged from the tapered pin 18 and a substantial portion of the straight stem of the locking pin 40 projects from the side of the spigot 14 for locking engagement in the hole 43 in the socket sleeve 31. When the locking pin 40 is in its intermediate position the arming catch 64 can remain engaged behind the recessed nut on the arming plunger, but when the arming catch is released from such engagement the arming plunger 56 is urged inwards by its associated spring 62 acting against the collar 69 engaged with the abutments 70 of the arming catch 64, to move the locking pin into its locking position.

Thus when it is desired to attach a wing 10 to the body 11 of the missile, the arming plunger 56 is withdrawn if necessary into its intermediate position and held there by the engagement of the tip of the arming catch 64 behind the recessed nut 66 on the end 61 of the plunger, the tapered pin 18 being also in the withdrawn position. The spigot 14 on the root of the wing 10 is now slid into the socket 31 in the body 11 until the slightly protruding ball catch 42 of the locking pin 40 is engaged by the rounded edge 33 of the socket sleeve 31 and is depressed thereby into the fully depressed position, allowing the spigot 14 to be slid fully home into the sleeve 31 until the ball catch 42 enters the co-operating locking hole 43 in the side of the sleeve 31 and snaps back. During these operations the tapered pin 18 remains held in its withdrawn position by the engagement with it of the detent 44 of the locking pin.

The depression of the ball catch 42 during the insertion of the spigot into the socket has caused the arming plunger 56 to move outwardly and so has freed the arming catch 64 from the nut 66. When the ball catch 42 enters the hole 43, therefore, the force of the arming spring 62 acting through the released plunger 56 and the rocking lever 50 moves the locking plunger 40 fully outwardly into its locked position in which the protrusion of the stem of the pin fully into the locking hole 43 of the socket sleeve 31 locks the wing against withdrawal from the body. This movement of the locking pin 40 to its locking position also withdraws the detent 44 from the tapered pin 18, allowing the latter to be driven sharply forward by the spring 22 associated with its plunger 19 into the smaller end of the tapered recess afforded by the registering grooves 17 and 35 of the spigot and socket, so that the tapered pin 18 becomes wedged firmly between the spigot and the socket and by this wedging action takes up any play between the wing and the body of the missile, and also supplements the action of the dowels 37 and holes 38 in holding the wing spigot firmly against rotation in the socket relatively to the body.

When it is desired to release the wing 10 from the missile body 11 the special key 29 referred to above is used. This comprises a handle from which protrude two generally parallel tapered blades 71 and 72 whose flats are disposed at right angles to one another. The key 29 is inserted in a correspondingly shaped guide hole in the wing so that the tapered blade 71 enters the longitudinal slot 28 in the head of the plunger 19, and by the camming action of its oblique edge as the key is pressed home it raises the plunger 19 so as to break the wedging action of the pin 18 and to hold the pin 18 in its withdrawn position in readiness for engagemen by the detent 44 of the locking pin 40. The oblique edge of the other blade 72 engages the protruding tip 57 of the pivoted lever 50, and as the key 29 is progressively pressed home the camming action between this blade 72 and the tip 57 of the lever 50 rotates the lever about its pivot 58 so as to move the arming plunger 56 and the locking pin 40 until the latter reaches its depressed position in which the detent 44 engages in the recess 45. The wing spigot can now be withdrawn from the socket. The tip of the arming catch 64 can then be swung manually into position for engagement behind the recessed nut 66 on withdrawal of the key. Finally, the key is gently withdrawn leaving the locking pin 40 in its intermediate position.

The attachment enables the wing to be mounted very rapidly on the missile body in a single motion, and to be quickly and easily detached by means of the key 29 provided. Moreover the attachment eliminates backlash between the wing and the body by virtue of the wedging of the tapered pin 18 in the registering grooves 17 and 35.

The spigot 14 carries within its bore an electric plug connector 75 which co-operates with a mating socket outlet (not shown) housed within the bore of the socket sleeve 31 in the missile body. The connection of the plug 75 with the socket outlet when the wing is assembled with the missile body can be employed to connect up flares or other electrical fittings carried by the wing to a source of supply within the missile body. Thus the electrical connection will be automatictally made and unmade as the wing is mounted and removed, without disturbance of any wiring or manipulation of separate connections.

What we claim as our invention and desire to secure by Letters Patent is:

1. In a releasable connector which comprises a spigot for permanent attachment to one of two members to be releasably connected together and a cooperating socket for permanent attachment to the other member, the spigot being insertable into the socket into a fully connected position therein, and releasable locking means operable to interlock the spigot and socket when in their fully connected position to prevent withdrawal of the spigot from the socket, the combination including a reciprocable bolt slidably mounted in a bore extending transversely within the spigot and arranged to cooperate with an abutment formed in the socket in a position in which it is in register with the bore of the spigot when the spigot is in the fully connected position with the socket, the bolt reciprocable between a locked position in which it protrudes from the spigot for engagement behind the abutment of the socket and an unlocked position in which it is withdrawn clear of the abutment to allow the withdrawal of the spigot from the socket, and a tapered wedging pin slidably mounted on the spigot for longitudinal movement relative thereto into a wedging position in which it is wedged between opposed surfaces of the spigot and socket when in the fully connected position, spring biasing means urging the wedging pin towards its wedging position, and means for manually withdrawing the wedging pin longitudinally from its wedging position.

2. The combination claimed in claim 1, in which the wedging pin is formed with a shoulder and in which the bolt is formed with a cooperating latch member, the latch member being arranged to engage behind the said shoulder when the bolt is in its unlocked position to hold the wedging pin against the action of the spring-biasing means in a position withdrawn from its wedging position, and to disengage from the shoulder and release the wedging pin when the bolt is moved to its locked position.

3. The combination claimed in claim 2 in which the spigot is formed in its surface opposed to the socket with an elongated groove extending parallel to its axis in which groove the wedging pin is slidably mounted and in which combination the transverse bore in the spigot intersects the groove, the latch member being formed on one end of the bolt and being arranged to enter the groove for engagement behind the shoulder of the wedging pin when the bolt is withdrawn from its locked position in which its other end protrudes from the spigot into engagement behind the abutment of the socket.

4. The combination claimed in claim 3 in which the releasable locking means includes a lever pivoted within the spigot and operatively engaging the bolt, the lever being movable by rocking about its pivot to move the bolt between its locked position and its unlocked position.

5. The combination claimed in claim 4 in which the pivoted lever is spring-biased in the direction corresponding to movement of the bolt towards its locked position.

6. The combination claimed in claim 5 which includes an arming catch interconnected with the pivoted lever and operable to retain the lever against its spring-biasing means in a position in which the bolt is in an intermediate position between its locked and unlocked positions, further movement of the bolt from its intermediate position in the direction towards its unlocked position against the action of the spring-biasing means of the pivoted lever serving to release the arming catch.

7. The combination claimed in claim 6 in which the end of the bolt which protrudes from the spigot for engagement behind the abutment of the socket is rounded and constitutes a ball catch arranged to cooperate with the opposed surface of the socket.

8. The combination claimed in claim 7, the socket being formed in its internal surface opposed to the spigot with an elongated groove extending parallel to its axis and arranged to be in register with the groove of the spigot to receive the wedging pin when the spigot and socket are in the fully connected position.

9. The combination claimed in claim 8 in which the wedging pin is of tapering circular cross-section, the two grooves being both of equally-tapering semi-circular cross-section.

10. The combination claimed in claim 9 provided with a casing formed with a keyhole, and provided with a key separate from the connector but capable of being inserted into the keyhole, the key when so inserted both engaging the wedging pin to withdraw it by a camming action from its wedging position and simultaneously engaging the pivoted lever to move the bolt from its locked position to its unlocked position.

11. The combination as claimed in claim 10 in which the key has two tapered blades connected to a common handle, one blade being formed with a cam edge for engagement with the wedging pin and the other blade being formed with a cam edge for engagement with the pivoted lever to cause it to move the bolt to its unlocked position.

12. In a connector which comprises a spigot for permanent attachment to one of two members to be releasably connected together and a cooperating socket for permanent attachment to the other member, the spigot being insertable into the socket into a fully connected position therein, and releasable locking means operable to interlock the spigot and socket when in their fully connected position to prevent withdrawal of the spigot from the socket, the combination including a reciprocable bolt slidably mounted in a bore extending transversely within the spigot and arranged to cooperate with an abutment formed in the socket in a position in which it is in register with the bore of the spigot when the spigot is in the fully connected position with the socket, the bolt being reciprocable between a locked position in which it protrudes from the spigot for engagement behind the abutment of the socket and an unlocked position in which it is withdrawn clear of the abutment to allow the withdrawal of the spigot from the socket, and a tapered wedging pin slidably mounted on the spigot for longitudinal movement relative thereto into a wedging position in which it is wedged between opposed surfaces of the spigot and socket when in the fully connected position, spring biasing means urging the wedging pin towards its wedging position, and means for manually withdrawing the wedging pin longitudinally from its wedging position, the wedging pin when in its wedging position engaging the bolt its locked position to prevent withdrawal of the bolt from its locked position.

References Cited in the file of this patent

UNITED STATES PATENTS

| | | |
|---|---|---|
| 2,240,400 | Johnson | Apr. 29, 1941 |
| 2,578,723 | McKenzie | Dec. 18, 1951 |
| 2,769,330 | O'Connell | Nov. 6, 1956 |
| 2,883,930 | Gott et al. | Apr. 28, 1959 |

FOREIGN PATENTS

| | | |
|---|---|---|
| 259,405 | Great Britain | Oct. 14, 1926 |